United States Patent [19]

Furumoto et al.

[11] 4,390,906
[45] Jun. 28, 1983

[54] MAGNETIC RECORDING AND/OR REPRODUCING SYSTEM FOR TELEVISION AND AUDIO SIGNAL

[75] Inventors: Mitsunobu Furumoto, Yao; Osahiko Yano, Ibaraki; Hiroshi Taniguchi, Hirakata; Kanji Kubo, Katano; Masamitsu Ohtsu, Kadoma, all of Japan

[73] Assignee: Matsushita Electric Industrial Co. Ltd., Osaka, Japan

[21] Appl. No.: 255,348

[22] Filed: Apr. 17, 1981

[30] Foreign Application Priority Data

Apr. 23, 1980 [JP] Japan .................................. 55-52852

[51] Int. Cl.³ ............................................ H04N 5/78
[52] U.S. Cl. .................... 360/19.1; 360/61; 360/33.1
[58] Field of Search ................. 360/19, 10, 33, 27, 360/8, 22, 23, 61, 19.1, 10.1, 10.3, 33.1; 369/47; 358/127, 335, 343, 341

[56] References Cited

U.S. PATENT DOCUMENTS

| 3,283,085 | 11/1966 | Lemke | 360/19 |
|---|---|---|---|
| 3,816,850 | 6/1974 | Otsuka | 360/19 |
| 3,846,819 | 11/1974 | Warren | 360/19 |
| 4,303,950 | 12/1981 | Taniguchi | 360/10 |

FOREIGN PATENT DOCUMENTS 2059135 4/1981 United Kingdom .................. 360/19

Primary Examiner—Alan Faber
Attorney, Agent, or Firm—Burgess, Ryan and Wayne

[57] ABSTRACT

A two speed or multi-speed video tape recorder of the conventional helical scan type in which the audio signal is capable of being recorded as a time compressed signal at one end of each helical video scan, or alternatively, in conventional longitudinal fashion by means of a stationary magnetic head engaging one edge of the tape.

At low tape transport speeds, improved bandwidth (and therefore sound fidelity) is obtained by use of the time compression technique; while at higher transport speeds, there are advantages in utilizing the stationary audio head.

Circuitry is provided to automatically utilize the time compression technique at lower tape transport speeds and the stationary head longitudinal recording technique at higher tape transport speeds. A pilot or cue signal is recorded on the tape, to automatically control the reproduction circuitry so that both types of recording methods can be interchanged on the same magnetic tape, with the reproducing circuitry switching accordingly between the two modes, as required.

16 Claims, 16 Drawing Figures

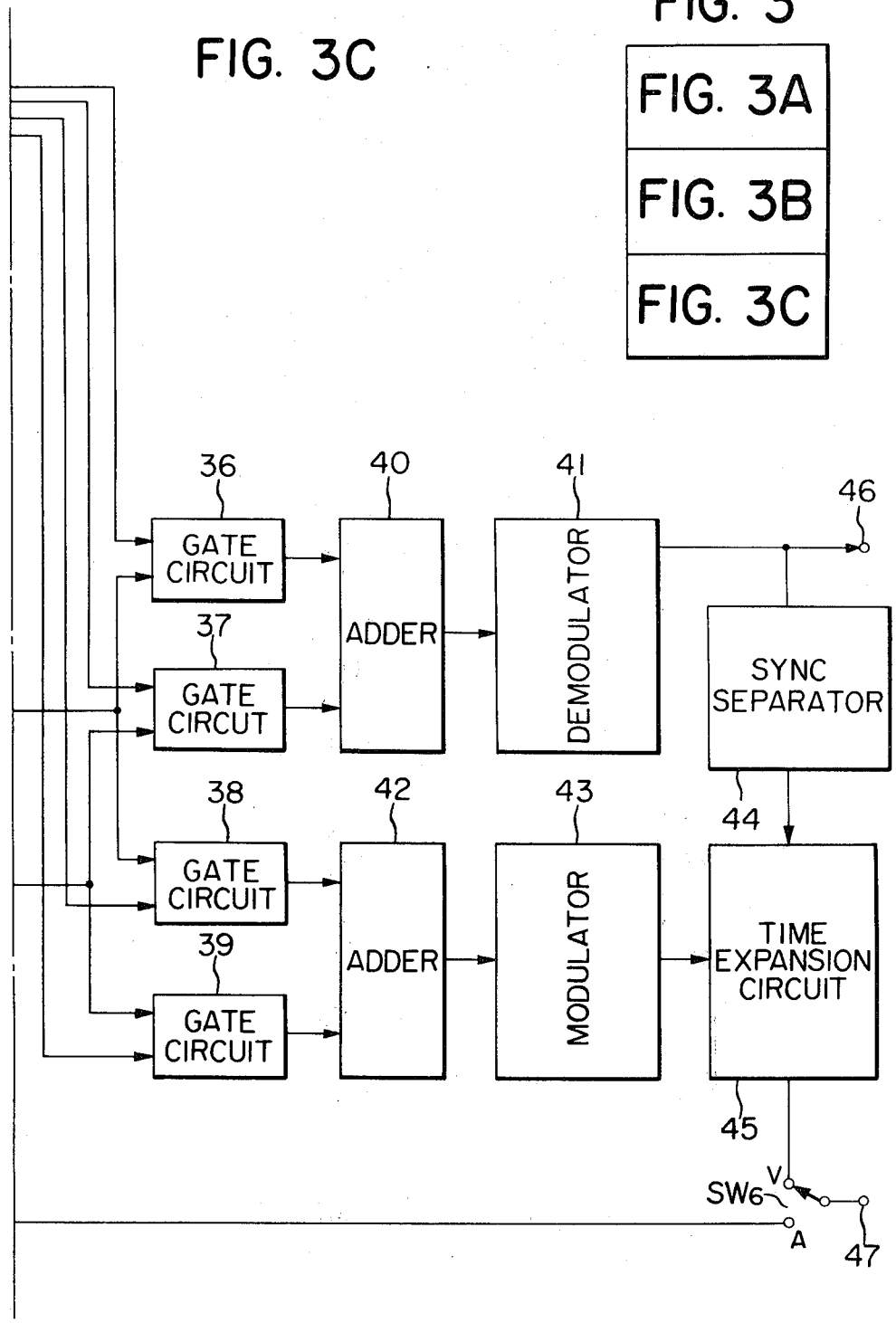

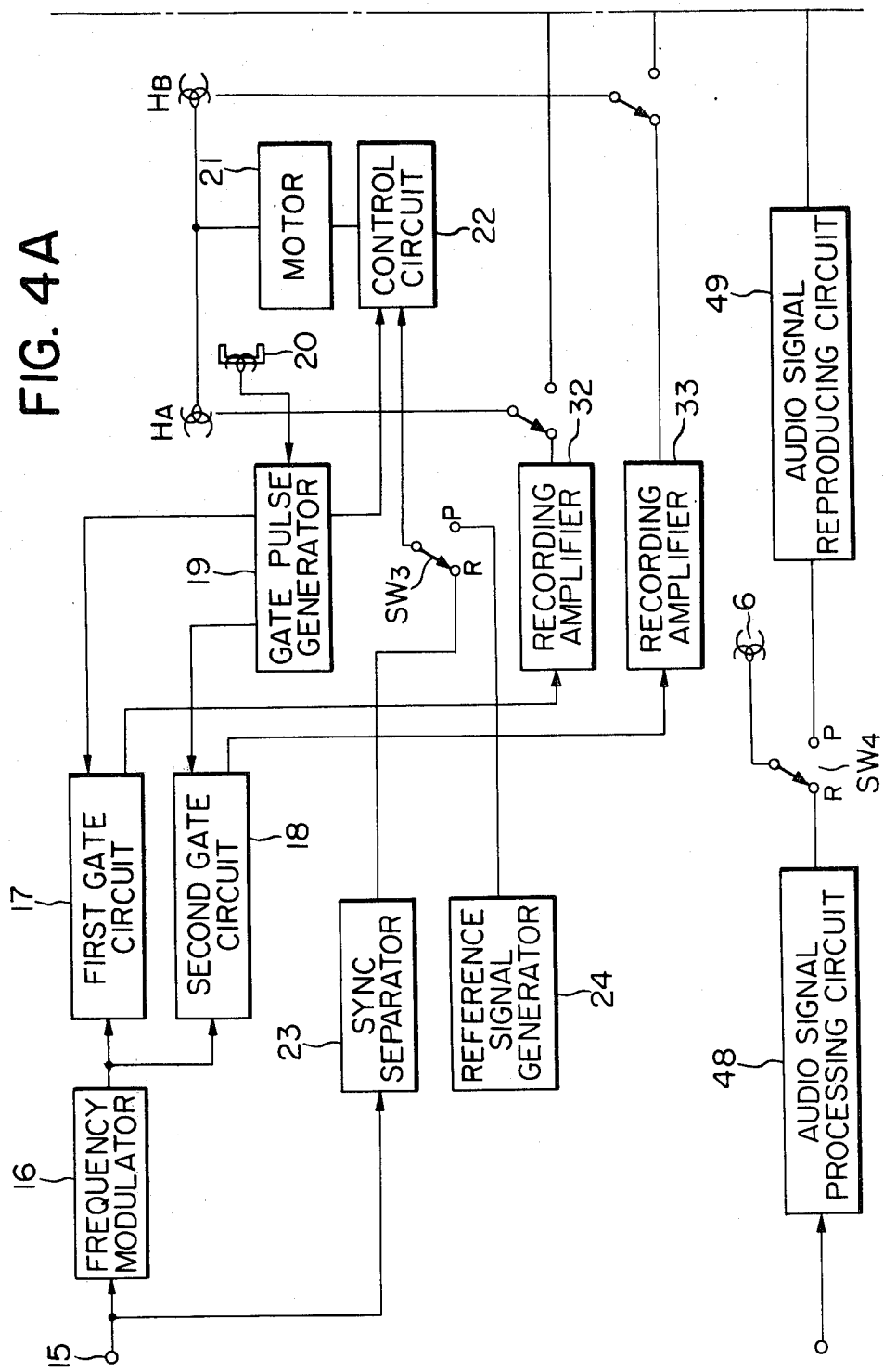

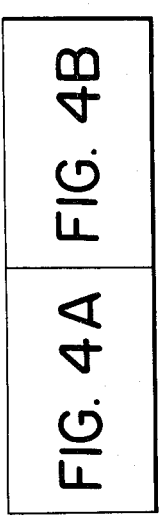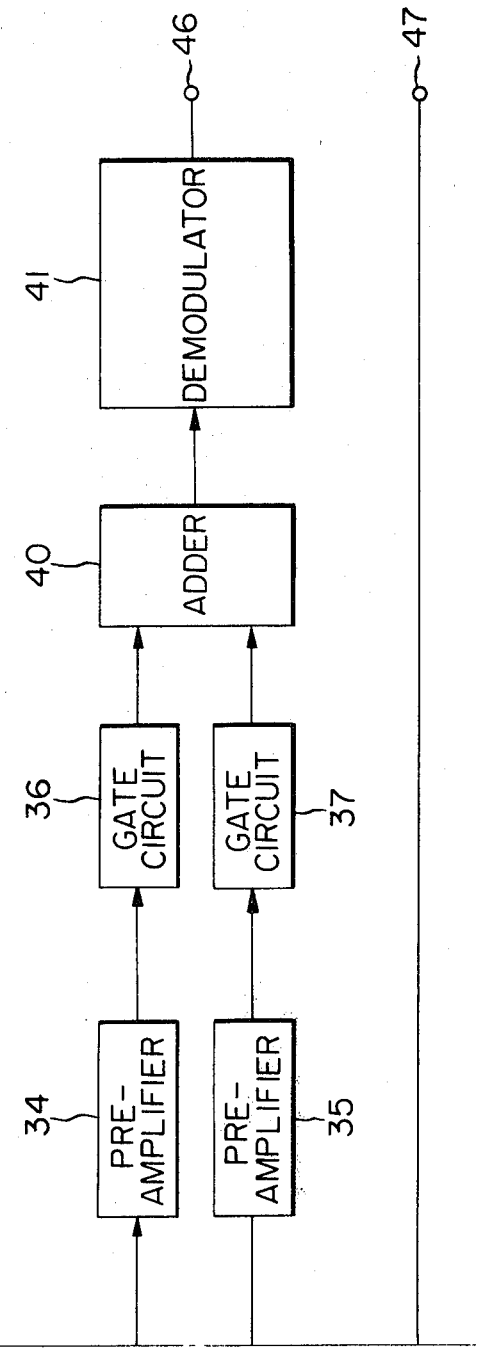

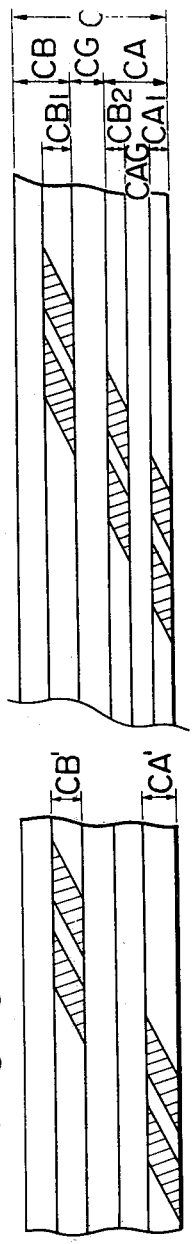
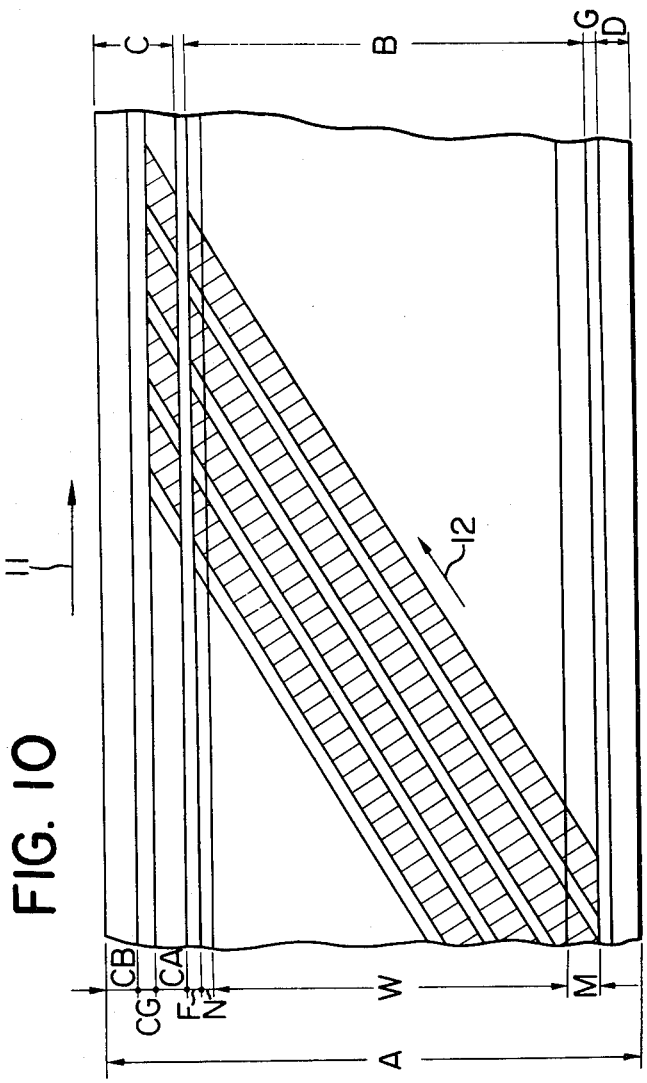
FIG. 9(a)
FIG. 9(b)
FIG. 10

MAGNETIC RECORDING AND/OR REPRODUCING SYSTEM FOR TELEVISION AND AUDIO SIGNAL

BACKGROUND OF THE INVENTION

The present invention relates to generally a magnetic television signal recording and/or reproducing system of the type in which rotating heads record the video signal in a series of oblique tracks on magnetic tape and more particularly a system for recording and/or reproducing the audio signal associated with the video signal.

Rotating head type magnetic video tape recorders are widely used for simultaneously recording and reproducing the video and audio signals. In general, the video signal is recorded and reproduced with rotating magnetic heads while the audio signal is recorded and reproduced with a stationary magnetic head.

Because of improvements in the quality of magnetic tapes and magnetic heads, advancement in signal processing techniques and control systems and the increase in accuracy in various components and mechanisms, the recording density of video signals has been remarkably increased. For instance, VHS system video tape recorders with a recording time of 4 hours have a recording density about 92 times as high as that of the video tape recorders used in broadcasting stations of the type having 4 heads and using magnetic tape 2 inches in width and about 11 times as high as that of EIAJ type I video tape recorders. VHS video tape recorders use magnetic tape of the ½ inch width which is transported at 1.65 cm/sec. Qualities and characteristics of tape and heads will be further improved, so that the recording density will be further increased.

For instance, assume that the present recording density is doubled. Then when ½ inch-tape is used, the transport speed will become about 0.8 cm/sec. When the transport speed is reduced to such an extremely low speed, the conventional audio signal recording systems with a stationary head cannot attain high-quality recording and reproduction because of the following reasons.

(a) As the transport speed is reduced, the recorded wavelengths of the audio signal becomes short, so that the recording and reproduction of the high-frequency audio signal becomes extremely difficult. Furthermore, a sufficient audio signal bandwidth (higher than 10 kHz) cannot be obtained. (When the tape transport speed is 1 cm/sec, the highest or upper limit is 5 kHz at the present state of the art.)

(b) As the tape transport speed is decreased, the output from a reproduce head drops; S/N is degraded.

(c) As the tape transport speed is reduced, the signal recording level is lowered and the dynamic range becomes narrow, so that distortions result.

(d) Accuracies of components and mechanisms are limited, so that wow and flutter are increased.

Therefore, even though the recording density of the video signal will be much increased, an increase in recording density of the audio signal will not result, because of the reasons described above, so that an increase in recording density of the television signal will be extremely difficult.

It may be proposed to use magnetic tapes ¼ or ⅛ inch in width in order to increase the recording density of the video signal without reducing the tape transport speed. However, magnetic tape of ¼ inch in width must be twice as long as magnetic tape of ½ inch in width in order to record the same amount of information at the same recording density. As a result, even though tape cassettes may be reduced in thickness to some extent (the thickness is reduced not to a half but two ⅔ because of the thickness of the case and the thickness of the reel hub remain unchanged and the space for housing the reels and the case also remains unchanged), the surface area would be increased. As compared with a ½ inch-tape cassette capable of recording for 2 hours, a ¼ inch-tape cassette will become very large in size and unbalanced. If a ⅛ inch-tape is used, a relatively high tape transport speed could be secured for satisfactory audio signal recording. However, the surface area of a tape cassette would become by far larger and unbalanced.

In addition to the above-described problems, there arise other problems in the case of recording and reproducing the video signal. That is, when tape width is reduced, skew distortions (discontinuity in time of the signal when heads are switched) would result due to expansion and compression of the tape. Furthermore, the angle of inclination of the oblique tracks relative to the tape center line would be decreased, so that waving results. As a result, the tape which is recorded by one video tape recorder cannot be reproduced by another. In addition, satisfactory air films cannot be formed between a rotating cylinder and a tape, so that the tape transport would be adversely affected and consequently jitter results. Thus, from the standpoint of recording and reproduction of the video signal, the use of tape with a larger width is advantageous.

As described above, with the conventional audio signal recording and reproducing systems with a stationary head, the problem of further increasing the recording density of the video tape recorders while maintaining tape cassettes in balanced shape cannot be solved.

In order to overcome these problems, there has been proposed a system which is used in conjunction with the video disk systems and in which the audio signal is frequency modulated at a center-frequency lower than the lower limit of the frequency-modulated video signal band and multiplexed with the FM video signal for recording. However, when such frequency multiplexing is employed, the additional recording of the audio signal (to be referred to as "after-recording" in this specification) cannot be attained. Such a multiplexing system may be advantageous for the video disk systems because their sole function is to reproduce the prerecorded video and audio signals, but cannot be used in the video tape recorder which, as its name implies, not only records the video and audio signals but also reproduces them.

In order to attain high-density recording and to permit the "after-recording" of the audio signal, there has been proposed a system in which the audio signal is time compressed and then recorded by means of rotating heads which are used for recording or reproducing the video signal. However, the audio signal compression and expansion circuits need an extremely large number of components so that there arise the problems that the video tape recorders become large in size and heavy in weight and the power consumption is increased. These problems may be negligible in the case of the home-use video tape recorders, but they are very serious in the case of the portable video tape recorders.

SUMMARY OF THE INVENTION

In view of the above, the present invention has for its object to provide a magnetic television signal recording and/or reproducing system in which the audio signal can be recorded and/or reproduced with either rotating heads or stationary heads.

More specifically, the present invention provides a magnetic television signal recording and/or reproducing system which, when used in a portable video tape recorder (which must be compact in size and light in weight), uses a stationary head for recording and/or reproducing the audio signal, but, when used in a home-use video tape recorder, uses either rotating heads or the stationary heads for recording and reproducing the audio signal.

According to the present invention, depending upon the purposes of recording or recording modes, the audio signal recording with the rotating heads or the stationary head is selected in such a way that at least a part of the audio signal recording band on tape may be used in common in both recording modes. As a result, two audio signal recording modes are compatible and the recording density can be increased.

The above and other objects, effects and features of the present invention will become more apparent from the following description of preferred embodiments thereof taken in conjunction with the accompanying drawings.

BRIEF DESCRIPTION OF THE DRAWINGS

FIGS. 3A, 3B, 3C, 4A and 4B are block diagrams of the first embodiment;

FIGS. 9(a), 9(b) and 10 are scanning patterns obtained by a second embodiment of the present invention.

Same reference numerals are used to designate similar parts throughout the figures.

DESCRIPTION OF THE PREFERRED EMBODIMENTS

Figure 1:
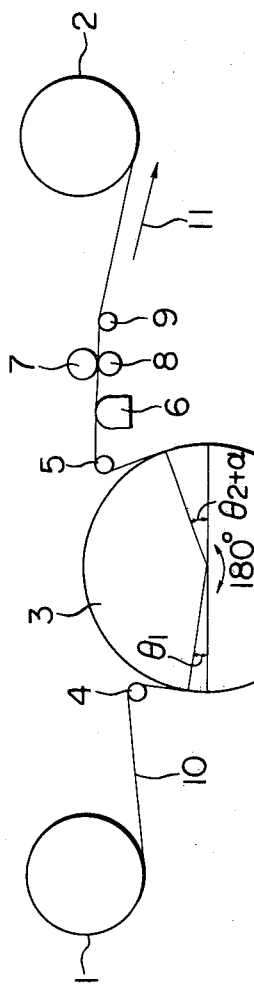
FIG. 1 is a schematic top view of a first embodiment of the present invention.

In FIG. 1 is shown a two-head helical-scanning type video tape recorder incorporating the present invention. Reference numeral 1 designates a supply reel and 2, a take-up reel. A magnetic tape 10 is transported in the direction indicated by an arrow 11 by a capstan 8 and a pinch roller 7 while wrapping around a cylinder 3. Posts 4, 5 and 9 are provided so as to ensure the smooth transport of the tape. A head 6 records and reproduces not only the audio signal but also the control signal.

Figure 2:
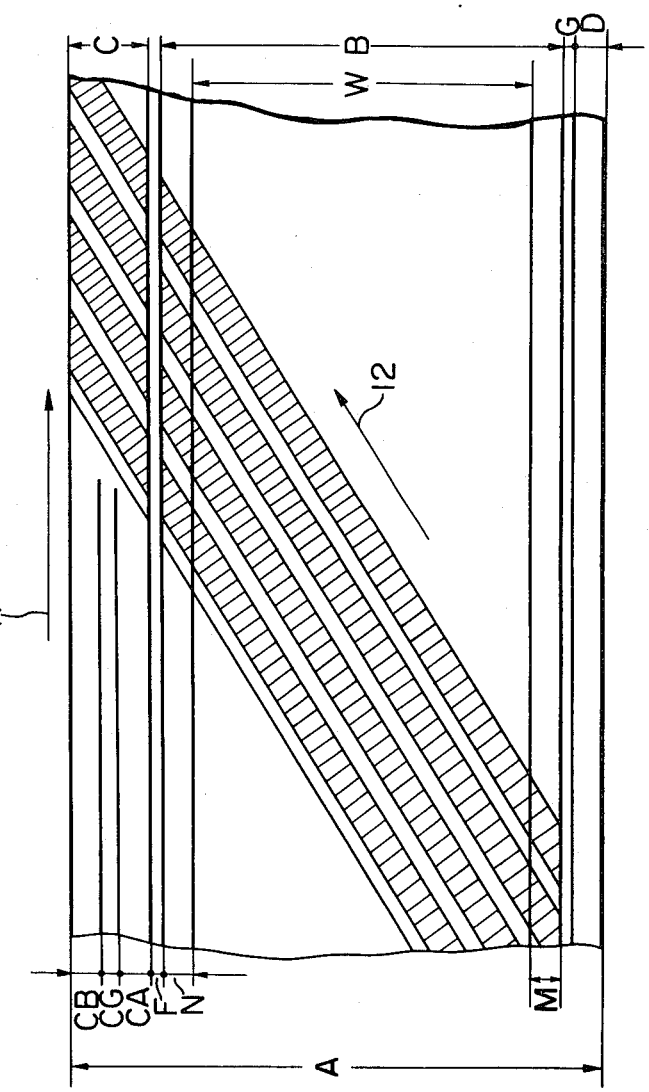
FIG. 2 is a scanning portion on magnetic tape obtained by the first embodiment.

The magnetic tape 10 is wrapped around the rotating head cylinder about 180° (180°+$\alpha$+$\theta_1$+$\theta_2$) and rotating heads $H_A$ and $H_B$ record the video signal in a series of oblique tracks as shown in FIG. 2.

Next, referring to FIG. 2, the scanning pattern on the magnetic tape 10 will be described in detail below. It is assumed that the cylinder head is rotating in the direction indicated by an arrow 12 and the tape is transported in the same direction as indicated by an arrow 11. FIG. 2 shows the scanning pattern as viewed from the front as with FIG. 1, but when viewed from the magnetic coating on the tape, the pattern must be viewed from the back of the paper.

In FIG. 2, A denotes the width of the tape; B, the whole width of the video signal recording band including overlaps; W, the contact width with which the 180° video head makes a contact with the tape; C, the width of the audio track; F, the width of the guard track between the video signal recording band and the audio track; G, the width of the guard band between the video signal recording band and the control track; D, the width of the control track; M, the front overlapping width; N, the back overlapping width; CA, the width of the first channel track; CG, the width of the guard band between the first and second channels; and CB, the width of the second channel.

Next, the method for recording the audio signal in the audio track with a stationary head or a rotating head will be described. The width A of the tape is, for instance, ½ inch (equal to 12.65 mm) and the width D of the control track is so selected that the control signal can be recorded and reproduced. The width C of the audio track is so selected that, in the case of portable VTRs, even though a completely satisfactory frequency response is not obtained (about 10 kHz), a satisfactory S/N can be obtained. In like manner, the width F between the audio and video tracks and the width G between the control and video tracks can be determined. Therefore, $$B=A-(D+G+F+C) \quad (1)$$

When one field is recorded in one track with rotating heads, the signal corresponding to $n_H/2$ (where $n_H$ is the number of horizontal scanning lines: 525 lines in the NTSC system and 625 lines in the PAL system) is recorded along the width W.

In general, the width M of the front overlapping and the width N of the back overlapping are made equal and are 8 horizontal scanning intervals or 8 H. Therefore, $$W = \frac{n_H/2}{n_H/2 + 8 \times 2} \times B = n_H B/n_H + 32 \quad (2)$$

Next, referring to FIGS. 1 and 2, the wrapping angle will be described. From FIGS. 1 and 2, $$\theta = M/W \times 180° \quad (3)$$

$$\theta_2 = N/W \times 180° \quad (4)$$

$$\alpha = (C+F)/W \times 180° \quad (5)$$

According to the present invention, therefore, the tape 10 is wrapped around the cylinder 3 by 180° plus $\theta_1$, $\theta_2$ and $\alpha$. To put into another way, the tape 10 is brought into contact with the cylinder 3 along the arc of $180°+\theta_1+\theta_2+\alpha$.

The front and back overlaps are recorded in order to compensate for not only low outputs at the entrance and exit of the cylinder in both the recording and reproduction modes but also drifts and variations of the head switching in the reproduce mode. According to the present invention, the portion of the tape succeeding the back overlapping track is still wrapped around the cylinder, so that the back overlapping suffices only to compensate for drifts and variations of the head switching in the reproducing mode. Therefore, the width M or N may be 2 or 3H and is not necessary to make $\theta_1$ equal to $\theta_2$.

Figure 3A:
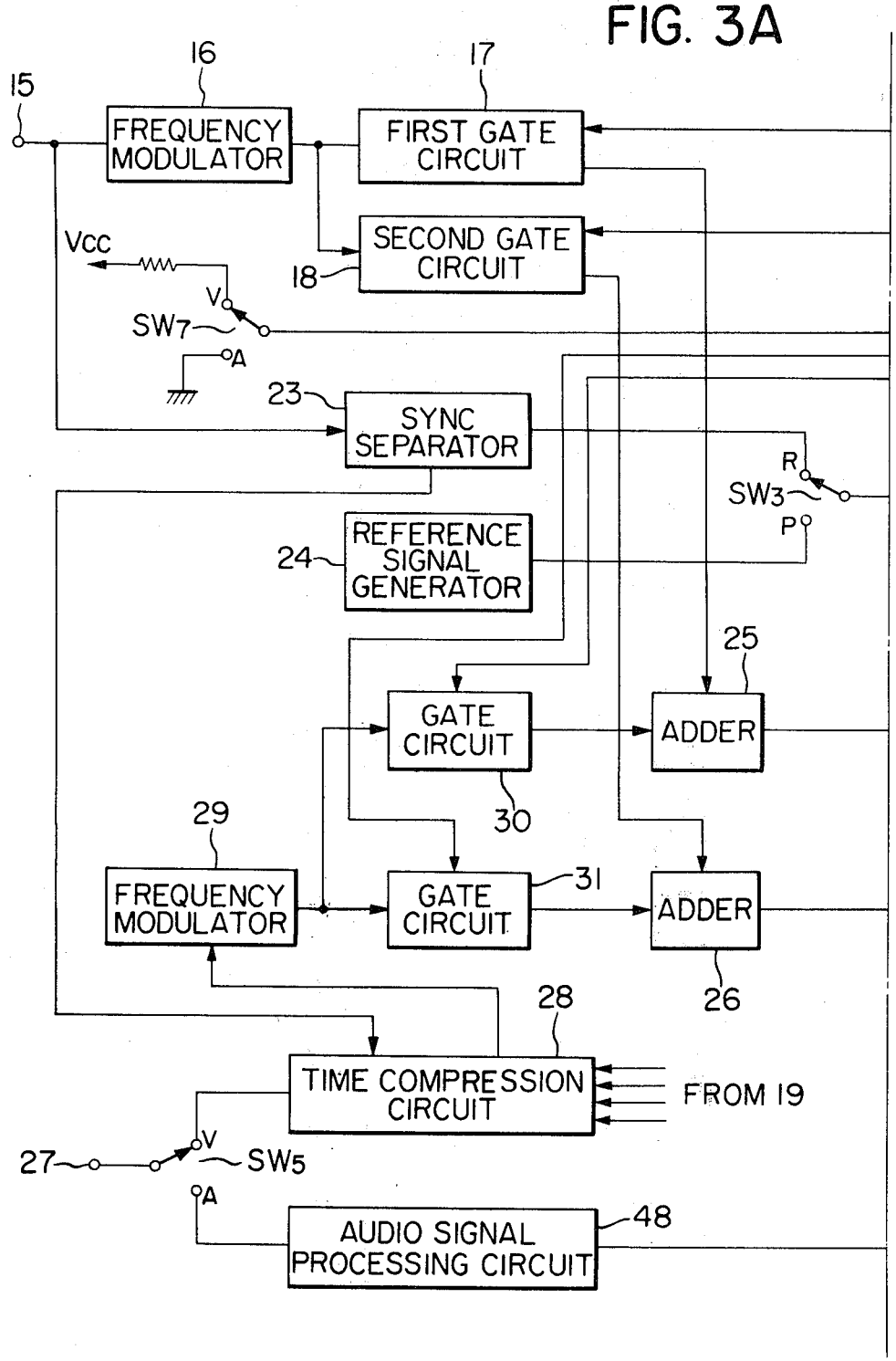
Figure 3B:
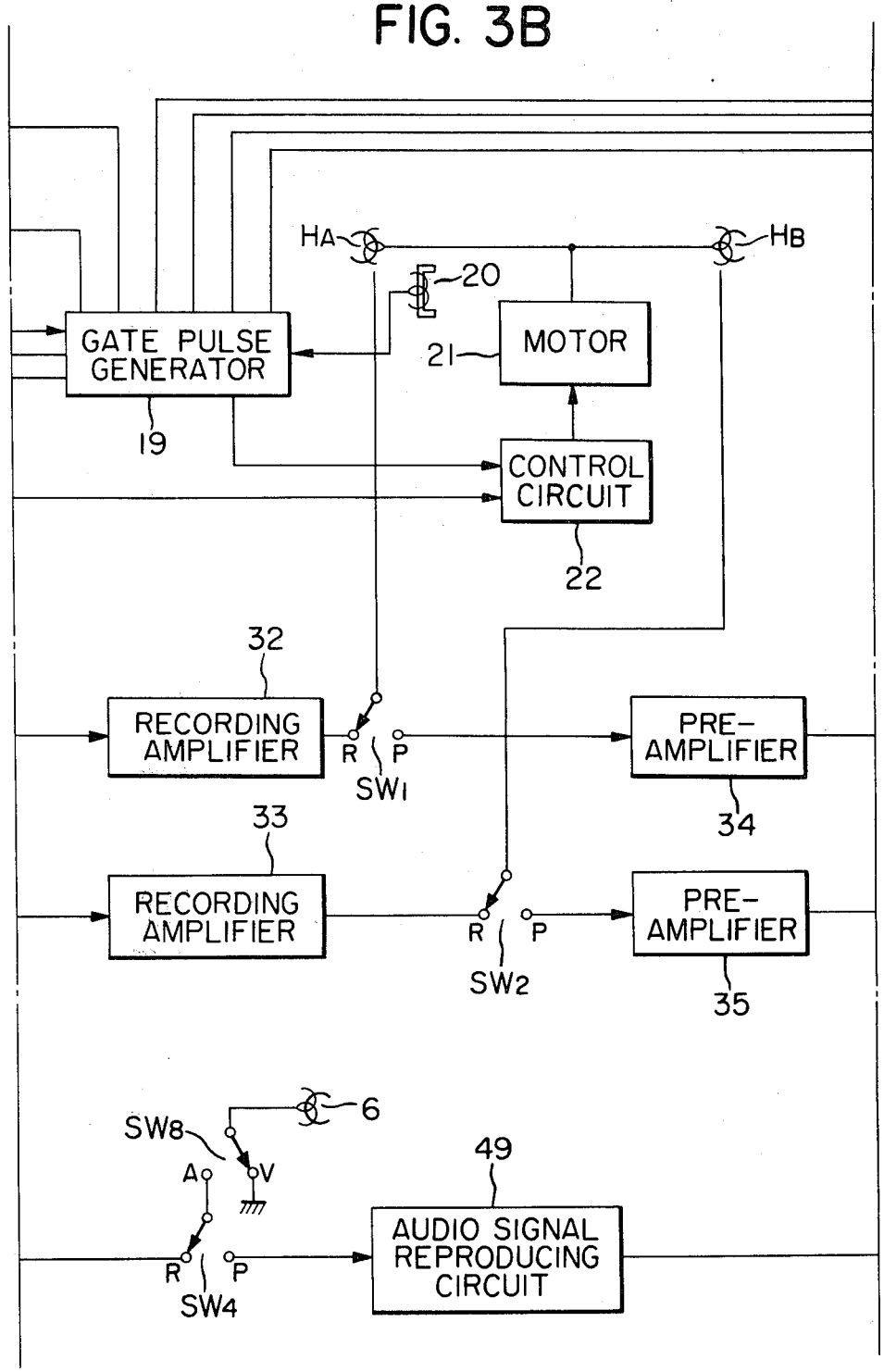

Next, referring to FIG. 3, the recording mode will be described. In FIG. 3, $SW_1$ to $SW_4$ are switches for selecting the recording mode R or reproducing mode P. $SW_5$ to $SW_8$ are switches for selecting the rotating head or the stationary head for recording the audio signal; that is, in the case of the recording with the rotating head, the stationary contacts V are connected but in the case of the recording with the stationary head, the contacts A are connected.

The incoming video signal impressed at an input terminal 15 is frequency modulated by a frequency modulator 16 the output of which is delivered to first and second gate circuits 17 and 18 so as to be gated in response to the pulses from a gate pulse generator 19. The gate pulse generator 19 receives the output signal from a rotating phase detector 20 for detecting the rotating phases of the rotating heads $H_A$ and $H_B$ and generates various timing pulses. One output signal from the pulse generator 19 is fed to a control circuit 22 which in turn controls the speed of the rotation of a motor 21 for rotating the rotating heads.

Figure 5:
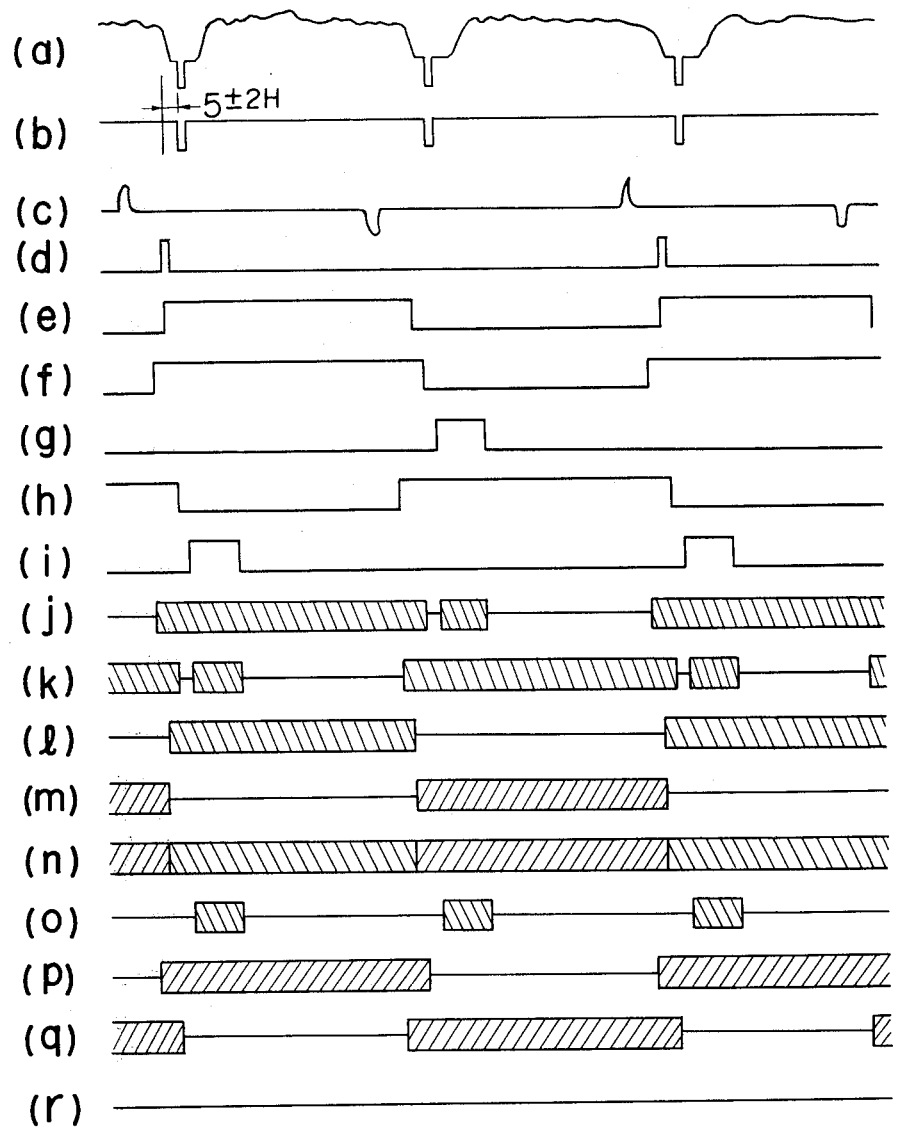
FIG. 5, consisting of a through r, shows waveforms used for the explanation of the mode of operation of the first embodiment.

The control circuit 22 receives not only the output signal from the gate pulse generator 19 but also the output signal from a sync separator 23 in the case of the recording or the output signal from a reference signal generator 24 in the reproduce mode through the switch $SW_3$. The control circuit 22 compares the phases of the two input signals and feed the driving current to the motor 21 in response to the difference signal representative of the phase difference between the two input signals. In the case of recording, the control circuit 22 controls in such a way that the vertical sync signal is recorded 5±2H after the head has been brought to the lower end of the band W (See FIG. 2); that is, the leading edge of the input video signal as shown at (a) in FIG. 5 is spaced apart in time by 5±2H from the timing as shown at (e) in FIG. 5 at which the reproduce head is switched. In the reproduce mode, the control circuit 22 receives the output signal from the reference signal generator 24 which has the same frequency as the output signal from the sync separator 23 and carries out the same control as described above.

The gate pulse generator 19 feeds to the gate circuits 17 and 18 the pulses as shown at (f) and (h), respectively, in FIG. 5. The gates 17 and 18 are opened for a relatively long time interval, so that the video signal is recorded in the front and back overlapping tracks in response to the pulse as shown at (e) in FIG. 5. The FM output signals from the gates 17 and 18 are fed to adders 25 and 26, respectively.

Next, the audio circuit will be described. When the rotating heads are used for recording, the audio signal impressed at an input terminal 27 is fed through the switch $SW_5$ to a time compression circuit 28 and the time-compressed signal is then fed to a frequency modulator 29. The time compression circuit 28 receives the horizontal sync signal from the sync pulse separator 23 and uses it as a reference signal for time compression.

The time-compressed FM audio signal is then fed to gate circuits 30 and 31 which receives the gating pulses from the gate pulse generator 19. Since the stationary terminal V of the switch $SW_7$ is closed, the gating pulses as shown at (g) and (i), respectively, in FIG. 5 are applied. The output signals from the gate circuits 30 and 31 are fed to the adders 25 and 26, respectively, and added with the FM video signals. The outputs from the adders 25 and 26 are fed to recording amplifiers 32 and 33, respectively. The output signals from the adders 25 and 26 are shown at (j) and (k), respectively, in FIG. 5.

The output signals from the adders 25 and 26 are fed to the recording amplifiers 32 and 33, respectively, and the output signals from the latter are fed to the rotating magnetic heads $H_A$ and $H_B$, respectively, through the switches $SW_1$ and $SW_2$ so as to be recorded on the tape 10 in the pattern as shown in FIG. 2.

The recorded composite signals which are reproduced by the magnetic heads $H_A$ and $H_B$ are fed to preamplifiers 34 and 35, respectively, through the switches $SW_1$ and $SW_2$. The output signal from the preamplifier 34 is fed to gate circuits 36 and 38 while the output signal from the preamplifier 35 is fed to gate circuits 37 and 39.

The gate circuit 36 also receives the output signal from gate pulse generator 19 as shown at (e) in FIG. 5 and fed the output signal as shown at (l) in FIG. 5 to an adder 40. The gate circuit 37 receives the output signal opposite in polarity to that shown at (e) in FIG. 5 from the gate pulse generator 19 and feed the output signal as shown at (m) in FIG. 5 to the adder 40. The adder 40 feeds its output, which is the continuous reproduced FM video signal as shown at (n) in FIG. 5, to a demodulator 41 and the output signal from the demodulator 41 is derived from a video output terminal 46.

The gate circuit 38 also receives the output signal as shown at (g) in FIG. 5 from the gate pulse generator 19 and passes only the audio signal in the reproduced FM signal (See (j) in FIG. 5) to an adder 42. The gate circuit 39 receives the output signal as shown at (i) in FIG. 5 from the gate pulse generator 19 and passes only the audio signal in the reproduced FM signal (See (k) in FIG. 5) to the adder 42. The two audio signals are added in the adder 42 as shown at (o) in FIG. 5 and fed to a modulator 43.

The demodulated time-compressed audio signal is then fed to a time expansion circuit 45. The reproduced video signal is also fed to a sync separator 44 and the output, that is the sync pulses, of which is also fed to the time expansion circuit 45. The continuous reproduced audio signal is derived from the time expansion circuit 45 and fed to an output terminal 47 through the switch $SW_6$. The switch $SW_8$ closes its V contact, so that no recording current flows and consequently the double-recording is inhibited; that is, the recording of an undesired audio signal in a prerecorded audio track can be avoided.

Next, the audio signal recording method with the stationary head will be described. First, the audio signal recording with the rotating heads $H_A$ and $H_B$ must be prohibited. When the switch $SW_7$ closes its contact A, the gate pulse generator 19 feeds to the gate circuits 30 and 31 the output signal as shown at (r) in FIG. 5, not the pulses as shown at (g) and (i) in FIG. 5. As a result, the gate circuits 30 and 31 remain closed, so that the recording amplifiers 32 and 33 deliver the output signals as shown at (p) and (q), respectively, in FIG. 5. As a consequence, when the rotating heads are passing over the audio track, no recording current flows through them.

The incoming audio signal impressed at the input terminal 27 is applied through the switch $SW_5$ to an audio signal processing circuit 48 the output of which in turn is fed through the switch SW$_8$ to a record-reproduce head 6 so as to be recorded in the audio track C on the tape 10 (See FIG. 2).

In the reproduce mode, the reproduced signal is fed from the head 6 through the switches SW$_8$ and SW$_4$ to an audio signal reproducing circuit 49 the output of which is delivered through the switch SW$_6$ to the output terminal 47.

An erase head may be disposed at the upstream of the recording-reproduce head 6 so as to erase the prerecorded audio signal. Then, the switching of the gating pulses as described previously may be eliminated.

Next, referring to FIGS. 6 and 7, the gate pulse generator 19 will be described in more detail.

Figure 6:
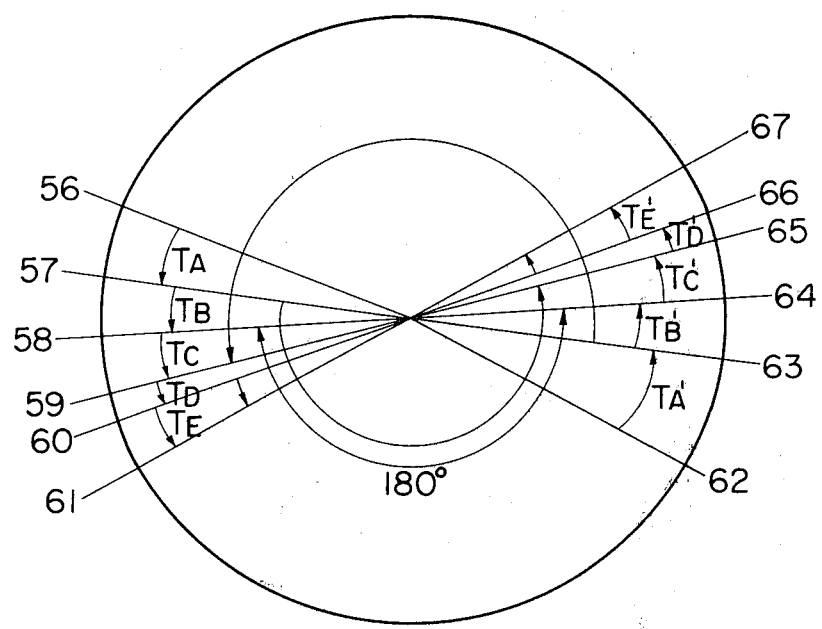
FIGS. 6 and 7 are views used for the explanation of a gate pulse generator.
Figure 7:
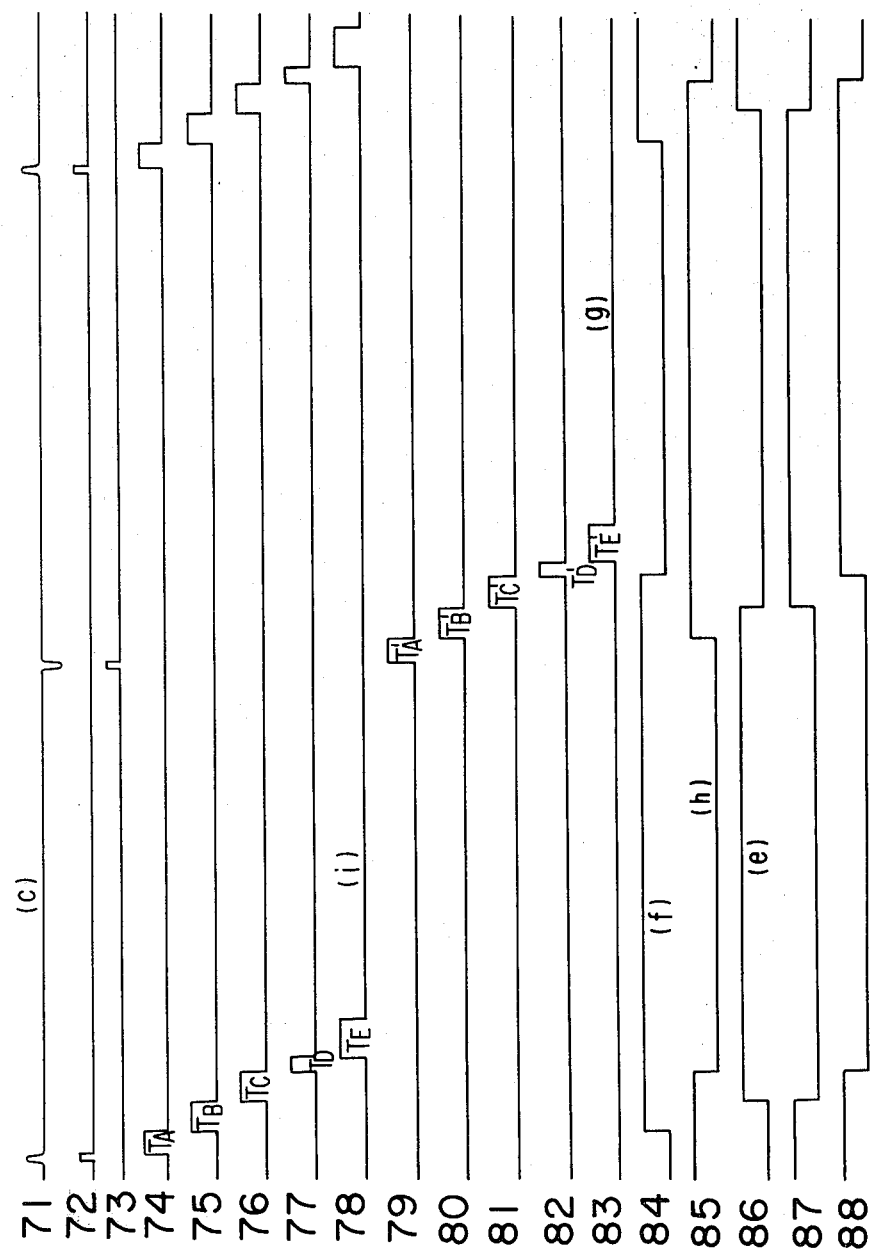

FIGS. 6 and 7 are views used for the explanation of the gate pulse generator 19 shown in FIG. 3.

FIG. 6 shows one of the rotating video heads. The video head must rotate through 180° in order to record the video signal in the band W shown in FIG. 2. When the video head H$_A$ is brought to the angular position 56 in FIG. 6, the rotating phase detector 20 detects a positive pulse as shown at 71 in FIG. 7 and detects a negative pulse when the head is brought to the angular position 62. The positive and negative pulses shown at 71 in FIG. 7 are amplified independently of each other and the output signals as shown at 72 and 73, respectively, are derived. A monostable multivibrator delives a pulse as shown at 74 so as to set a time required for the head H$_A$ to reach the starting point of the front overlapping portion. A monostable multivibrator delivers the output signal as shown at 75 in order to set the head switching timing in the reproduce mode. T$_C$ is the output from a monostable multivibrator for setting the end of the back overlapping portion recorded by the head H$_B$. Reference numeral 77 denotes the output of a monostable multivibrator for preventing the recording in the guard band between the video signal recording band and the audio track. Reference numeral 78 denotes the output from a monostable multivibrator for setting the timing of recording the audio signal with the head H$_B$. Reference numeral 79 shows the output of a monostable multivibrator for setting a time required for the head H$_B$ to reach the starting point of the front overlapping portion. Reference numeral 80 shows the output of a monostable multivibrator for setting the head switching timing in the reproduce mode. Reference numeral 81 shows the output from a monostable multivibrator for setting the time interval for recording back overlapping with the head H$_A$. Reference numeral 82 shows the output from a monostable multivibrator for setting a time interval required for the head H$_A$ to pass past the guard band between the video signal recording band and the audio track. Reference numeral 83 shows the output from a monostable multivibrator for setting a time interval for recording the audio signal with the head H$_A$. From these outputs from the monostable multivibrators, gating pulses as shown at 84 through 88 are generated.

In FIG. 6, the tape is shown as being wrapped around the cylinder 3 through 360°, but, in practice, the heads H$_A$ and H$_B$ are angularly spaced apart from each other by 180°, so that the tape is brought into contact with heads as shown in FIG. 1.

T$_A$ represents the time when the rotating phase detector 20 detects a pulse and T$_A'$ represents a time interval to the starting point of the front overlapping portion. Therefore, they must be adjusted for each recording system as shown in FIG. 1.

T$_B$ and T$_B'$ set a time interval to the front overlapping recording. Therefore, T$_B$ is given by $$T_B = (\theta_1/360) \times [1/(f_V/2)] \tag{6}$$

where f$_V$ is the frequency of the vertical sync pulses.
In like manner, $$T_C = \frac{\theta_2}{360} \times \frac{1}{f_V/2} \tag{7}$$

$$T_D = \frac{F/W \times 180}{360} \times \frac{1}{f_V/2} = \frac{F}{W} \times \frac{1}{f_V} \tag{8}$$

$$T_E = \frac{C/W \times 180}{360} \times \frac{1}{f_V/2} = \frac{C}{W} \times \frac{1}{f_V} \tag{9}$$

So far the time delays are set by the gate pulse generator 19 consisting of monostable multivibrators, but it is to be understood that the gate pulse generator 19 may comprise pulse-counting type time delay means which count clock pulses. Each monostable multivibrator has been so far described as being triggered by the output from the preceding one, but it is to be understood that the monostable multivibrators may be triggered in response to the outputs as shown at 74 and 79 based on T$_A$ and T$_A'$.

So far the pulses have been described as being detected at positions spaced apart from each other by about 180° in one rotation, it is to be understood that only one pulse may be detected in one rotation. In this case, the time delays of T$_A'$ through T$_E'$ must be increased so as to cover 180°.

Figure 8:
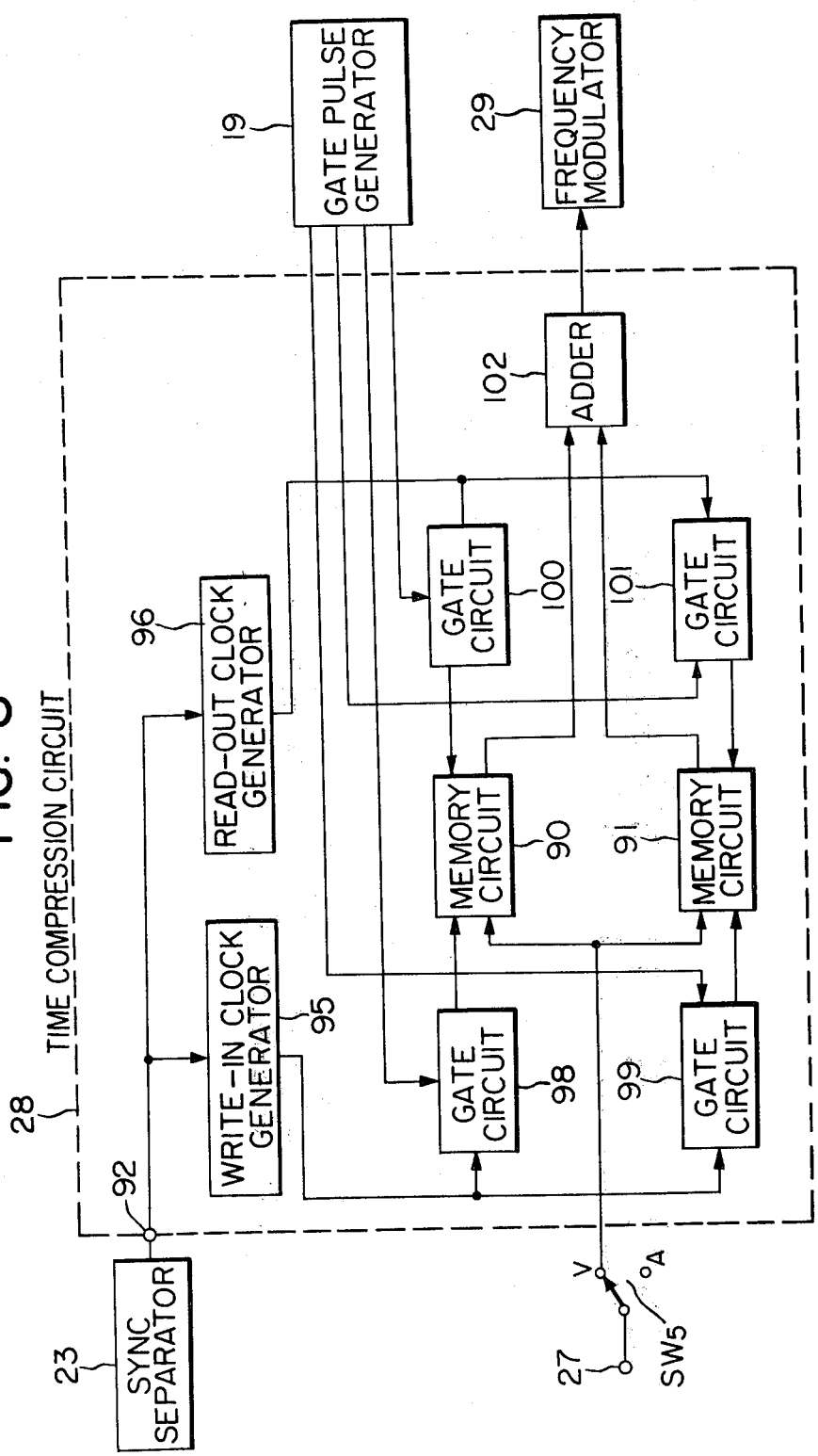
FIG. 8 is a block diagram of a time compression circuit.

Next, referring to FIG. 8, the time compression circuit 28 will be described. The incoming audio signal impressed at the input terminal 27 is fed through the contact V of the switch SW$_5$ to memory circuits 90 and 91. The sync pulses from the sync separator 23 are impressed to an input terminal 92 and fed to a write-in clock generator 95 and a read-out clock generator 96. The write-in clock generator 95 generates, for example, the clock pulses at a frequency f$_W$ which is equal to 32 kHz, that is, twice as high as the horizontal scanning frequency f$_H$. In response to the pulses from the clock pulse generator 95, the audio input signal is sampled and stored in the memory circuits 90 and 91. When the audio signal is sampled at the frequency f$_W$ which is equal to 32 kHz, the signals up to about 15 kHz may be recovered.

Gating pulses from the gate pulse generator 19 are fed to gate circuits 98 and 99. The input signal is the output signal from a flip-flop FF as shown at 88 in FIG. 7, the flip-flop being trigged in response to the rising edges of the pulses shown at 77 and 87 in FIG. 7. Every time when the cylinder rotates through 180°, the write-in clock pulse is fed to the memory circuit 90 or 91. Therefore, it follows that when the clock pulses have the frequency equal to 2 f$_H$, the memory circuits can store 525 sampled data in the case of NTSC system.

In response to the read-out clock pulses from the clock pulse generator 96, the stored signals are read out. The read-out clock pulse frequency f$_R$ may be 40 times as high as the horizontal scanning frequency. Then, $$f_R/f_W = (40 f_H)/(2 f_H) = 20 \tag{10}$$

It follows, therefore, that the audio signal which has been stored during almost one vertical scanning time interval can be read out within 1/20 of the time interval.

The output signals from the gate pulse generator 19 are fed to gate circuits 100 and 101 and in response to the output clock pulses from the gate circuits 100 and 101 the contents in the memory circuits 90 and 91 are read out alternately and added in an adder 102. The output signal from the adder is then fed to the frequency modulator 29.

So far the 1/20 compression has been described, but according to the present invention the W/C-times compression is enough as seen from FIG. 2. As described previously, the recording at the edges of the tape is difficult, so that the audio signal may be compressed by 2W/C times and recorded only in one half of the audio track.

The time expansion circuit 45 substantially similar in construction to the time compression circuit 28 except that the write-in clock generator in the recording signals is used as the read-out clock generator and the read-out clock generator in the recording signals is used as the write-in clock generator.

When the audio signal is recorded in the manner described above, the continuous signal which is delayed by about one vertical sync time interval is reproduced. In general, the time delay between the video signal and the audio signal is less than 50 msec which is allowable. Therefore, the time delay of about 16.6 msec in the NTSC system or about 20.0 msec in the PAL system is negligible.

Memory elements may be analog memory elements such as BBD or capacitors, but it is to be understood that the sampled data is converted by an A/D converter into the digital signal and stored in a random access memory or the like. In the reproduce mode, the read-out data may be converted by a D/A converter into the analog signal so that the reproduced audio signal may be processed in a manner substantially similar to that described above.

Next, the frequency band of the time-compressed audio signal will be discussed below. When the audio signal of about 15 kHz is time-compressed to 1/20 in the manner described above, its frequency band becomes 300 kHz. (According to the present invention, the compression ratio may be W/C. According to VHS standards W is equal to 10.07 and C is equal to 1.00, the compression ratio is about 1/10.)

As compared with the video signal band of about 3 MHz, the frequency band of 300 kHz is very narrow. As a result, in the case of the frequency modulation, the carrier of from hundreds kHz to a few MHz may be arbitrarily selected and the recording and reproduction with a high S/N can be attained.

Therefore, the compression ratio can be further increased to 1/100 beyond 1/20. In addition, the frequency-division recording is possible in which more than two signals frequency-modulate carriers of different frequencies.

So far the present invention has been described in detail in conjunction with the recording of the audio signal in one channel with the stationary or rotating heads, but it is to be understood that the present invention may be equally applied to the recording of the audio signal into two channels with stationary or rotating heads. In the latter case, two time compression circuits and two time expansion circuits are needed and the gate pulse generator 19 must be modified accordingly. The compression ratio becomes W/CA or W/CB. (According to the VHS standards, W=10.07 mm and CA=CB=0.35 mm, W/CA or W/CB≈28.8.)

FIG. 9 shows, on enlarged scale, the audio track shown in FIG. 9. FIG. 9(a) shows the audio signal recorded in two channels CA and CB with the stationary heads. Since the recording of the audio signal is difficult at the edges of the tape, the audio signals are recorded along the audio tracks CA' and CB' which are closer to the center line of the tape. (According to the VHS standards, when CA is equal to 2CA', the compression ratio W/CA' is equal to about 57.6, but the satisfactory recording can be ensured as described previously.)

In the case of the audio signal recording pattern as shown at (a) in FIG. 9, unused audio tracks are left. Therefore, the first channel track CA can be divided into a first audio track $CA_1$ and a second audio track $CA_2$ which are separated from each other by a guard band CAG as shown at (b) in FIG. 9. According to the VHS standards, $CA_1=CA_2=CB_1=0.12$ mm and $CAG=0.11$ mm, so that the compression ratio $W/CA_1$ becomes about 83.9. Thus, satisfactory recording can be ensured as described previously. Thus, one audio channel can be recorded along the track CB with the stationary head while with the rotating heads two channels may be recorded in the audio tracks $CA_1$ and $CA_2$.

FIG. 10 shows another embodiment of the present invention having an audio track CA in which the audio signal is recorded with rotating heads, an audio track in which the audio signal is recorded with a stationary head and a guard band CG interposed therebetween. The width F of the guard track between the audio track CA and the video signal recording band B may be 5H. The guard band CG corresponds a conventional guard band between the audio track and the video signal recording band and may be 0.3 mm in width.

The width of the audio track CA may be $n_H/2 \times 1/20 = n_H/40$ when the audio signal corresponding to one field is compressed to 1/20 as will be described in detail below. ($n_H$ is 525 in the case of the NTSC system or 625 in the case of the PAL system.)

The front overlapping track is, in general, 8H in width because at the start of the wrapping of the tape around the cylinder it is difficult to reproduce the output at a satisfactory level and variations in head switching must be compensated for in the reproduce mode. The same is true for the audio track CA. That is, the width of the audio track CA is of the order of $(n_H/40+8)$H because an extra width of 8H must be added in order to compensate for an unsatisfactory envelope produced at the exit of the cylinder. In selecting the width N of the back overlapping track, it suffices only to consider the variations in head switching. Therefore, the width N may be 3H. Thus, $$B+F+CA=A-(D+CG-CB+G) \qquad (11)$$

In the case of recording one field television signal in one track with rotating heads, $n_H/2$ lines video signal is recorded in the video signal recording band width W. Therefore, $$W = \frac{n_H/2}{(n_H/2 + 8 + 5) + 5 + (n_H/40 + 8)} \times (B + F + CA) \qquad (12)$$

Next, the wrapping angle ($\theta_1$, $\theta_2$ and $\alpha$) will be described. From FIGS. 1 and 10, $$\theta_1 = M/W \times 180° \quad (13)$$

$$\theta_2 = M/W \times 180° \quad (14)$$

$$\alpha = (CA+F)/W \times 180° \quad (15)$$

According to the present invention, the tape 10 is wrapped around the cylinder 3 through 180° plus $\theta_1$, $\eta_2$ and $\alpha$ which are obtained from Eqs. (13), (14) and (15). With the tape format described above, when only the audio signal is recorded with rotating heads, bands which are not capable of being recorded are needed because of inferior contact of the heads to the magnetic surface of the tape. However, with the scanning pattern as shown in FIG. 10, the tape 10 may be completely used across its whole width. In addition to the audio signal, any other desired signal such as cue signals may be recorded in the audio track CB.

FIG. 4 shows a block diagram of a recording and reproducing system for recording and reproducing the audio signal only with a stationary head. The mode of operation of this system is apparent from the description of the system shown in FIG. 3, so that no further description shall be made.

According to the VHS standards, W/C is equal to about 10 and the width W can be reduced with decrease in width of the tape. However, when the stationary head is used, the width C of the audio track cannot be reduced, so that the ratio W/C becomes inevitably small. As a result, the compression ratio is decreased, so that the audio signal may be recorded in a plurality of channels.

So far the present invention has been described in conjunction with an analog FM signal, but it is to be understood that the present invention may be equally applied to PCM recording.

In the case of the previous description, the incoming audio signal is sampled, converted into the digital signal and stored in a RAM. The contents in the RAM is read out, converted into the analog signal and then frequency modulated. In the case of the PCM recording and reproduction, a parallel output which is read out from the RAM and consists of from a few to tens bits is converted into a serial signal, coded by, for example, MFM and recorded. In the reproduce mode, the reproduced signal is decoded, converted into a parallel signal and stored in the RAM.

Next, a method for detecting whether the audio signal was recorded with the rotating heads or with the stationary head will be described.

An identification code or signal may be recorded. For instance, a burst signal may be recorded in the control signal track in such a way that the burst signal may be separated from the control signal. In response to the presence or absence of the burst signal, the rotating heads or the stationary head is selected. Alternatively, the frequency of the burst signal may be varied depending upon whether the audio signal is recorded with the rotating heads or the stationary head. Therefore, in response to the change in frequency of the burst signal, the rotating heads or the stationary head may be selected. The identification code may be not recorded in the control track but may be recorded together with the vertical sync signal in the video signal. The identification code is detected by a recorded signal detecting circuit.

In summary, according to the present invention, when it is desired to make the system compact in size and light in weight, the audio signal recording with the stationary head may be selected, but when high-quality audio signal recording and reproduction is more desired than the reduction in size of the system, the audio signal recording with the rotating heads may be selected.

In the case of a system in which the tape transport speed may be varied, the audio signal recording with the stationary head may be selected at a higher speed while the audio signal recording with the rotating heads may be selected at a lower speed. As a result, there always exists a track or band which may be used in common in both modes of recordings with the rotating heads and with the stationary head.

According to the present invention, more effective use of the magnetic tape can be attained in the video tape recorders of the type in which either of two recording modes may be selected.

What is claimed is:

1. A magnetic television signal recording system characterized by having:
   a first recording mode in which a video signal is recorded by rotating magnetic heads in a series of oblique tracks on a magnetic tape, said oblique tracks being inclined at an angle with respect to the center line of said magnetic tape and being discontinuous, and wherein an audio signal is time-compressed and recorded with said rotating heads at predetermined portions of said oblique tracks adjacent to the ends thereof, and
   a second recording mode in which the audio signal is recorded by means of a stationary head in a track parallel to the center line of said magnetic tape;
   the tracks in which the audio signal is recorded in said first recording mode and the track in which the audio signal is recorded in said second recording mode being wholly or partially coincident with each other; and
   means for selectively causing said television signal recording system to operate in said first recording mode or said second recording mode.

2. A magnetic television signal recording system as set forth in claim 1 further characterized in that
   an audio signal recording track in which the audio signal or other information such as a cue signal is recorded with a stationary head is provided between said portions in which the time-compressed audio signal is recorded by means of said rotating magnetic heads in said first recording mode and one edge of said magentic tape closer to said portions.

3. A magnetic television signal recording system as set forth in claim 2 further characterized in that
   a first audio signal is time-compressed and recorded in said first-recording-mode portions by means of said rotating magnetic heads, and
   a second audio signal is recorded in said audio signal recording track extended in parallel with said one edge of the magnetic tape while said first audio signal is recorded.

4. A magnetic television signal recording system as set forth in claim 1 further characterized in that
   said first audio signal recording mode is used when the magnetic tape is transported at a lower speed so as to attain a high-density recording, and said second audio signal recording mode is used when the magnetic tape is transported at a higher speed.

5. A magnetic television signal recording system as set forth in claim 1 further characterized in that a plurality of time-compressed audio signal channels are recorded in a time division mode in said first-recording-mode portions.

6. A magnetic television signal recording system as set forth in claim 1 further characterized in that said portions in which the time-compressed audio signal is recorded by means of said rotating magnetic heads in said first recording mode are defined at the downstream of the back overlapping portions of the video signal recording tracks, that is, on the side of one edge of the magnetic tape at which the rotating magnetic heads leave the magnetic tape.

7. A magnetic television signal recording system as set forth in claim 1 further characterized in that a video-audio guard band in said first recording mode has a narrower width than that in said second recording mode.

8. A magnetic television signal recording system as set forth in claim 1 further comprising:

a gate pulse generating means for generating gate pulses for time compressing the audio signal and recording the time-compressed audio signal by means of said rotating magnetic heads in said first recording mode, said gate pulse generating means providing (i) back overlapping pulses in response to the pulses representative of the rotating phases of said rotating magnetic heads, (ii) video-audio guard pulses in response to the trailing edges of said back overlapping pulses, and (iii) time-compressed audio signal recording pulses with a predetermined pulse duration, in response to the trailing edges of said video-audio guard pulses.

9. A magnetic television signal recording and reproducing system characterized by having a first recording mode in which a video signal is recorded by rotating magnetic heads in a series of oblique tracks on a magnetic tape, said oblique tracks being inclined at an angle with respect to the center line of said magnetic tape and being discontinuous, and wherein an audio signal is time-compressed and recorded with said rotating heads at predetermined portions of said oblique tracks adjacent to the ends thereof, the recorded video signal is reproduced, and the recorded audio signal is reproduced;

a second recording mode in which the audio signal is recorded by means of a stationary head in a track in parallel with the center line of said magnetic tape;

the tracks in which the audio signal is recorded in said first recording mode and the track in which the audio signal is recorded in said second recording mode being wholly or partially coincident with each other; and switching means for selectively causing said television signal recording and reproducing system to operate in said first recording mode or said second recording mode.

10. A magnetic television signal recording and reproducing system as set forth in claim 9 further characterized by having a switch to select said first or second audio signal recording or reproducing mode.

11. A magnetic television signal reproducing system for reproducing a television signal from a magnetic tape which may contain a time-compressed audio signal at predetermined portions of oblique tracks or an audio signal on a track parallel to the center line of said tape, said system having:

a first producing mode in which a video signal is reproduced by rotating magnetic heads from a series of oblique tracks on a magnetic tape, said oblique tracks being inclined at an angle with respect to the center line of said magnetic tape and being discontinuous, a time-compressed audio signal being reproduced with said rotating heads from predetermined portions of said oblique tracks adjacent to the ends thereof;

a second reproducing mode in which an audio signal is reproduced by means of a stationary head from a track in parallel with the center line of said magnetic tape;

the tracks from which the audio signal is reproduced in said first reproducing mode and the track from which the audio signal is reproduced in said second mode being wholly or partially coincident with each other; and switching means for selectively causing said television signal reproducing system to operate in said first reproducing mode or said second reproducing mode.

12. A magnetic television signal recording and/or reproducing system of the type in which the video signal is recorded by means of rotating magnetic heads in a series of oblique tracks on a magnetic tape, said oblique tracks being inclined at an angle relative to the center line of the magnetic tape and being discontinuous, characterized in that a first magnetic recording system time compresses an audio signal associated with said video signal and records it by means of said rotating magnetic heads on extension lines of the video signal recording tracks which are discontinuous from each other and which have a predetermined length; and a second magnetic recording system records the audio signal by means of a stationary magnetic head in a continuous audio signal recording track which is extended in parallel with the center line of the magnetic tape and which is in the corresponding portion of the magnetic tape on which said extension lines of the video signal recording tracks are defined.

13. A magnetic television signal recording and/or reproducing system as set forth in claim 12 further characterized in that said continuous audio signal recording track comprising a plurality of continuous sub-tracks extended in parallel with each other and with the center line of the magnetic tape, and said downstream extensions of the video signal recording tracks include at least one of said continuous sub-tracks.

14. A magnetic television signal recording system characterized by having:

a first recording mode in which a video signal is recorded by rotating magnetic heads in a series of oblique tracks on a magnetic tape, said oblique tracks being inclined at an angle with respect to the center line of said magnetic tape and being discontinuous, and wherein an audio signal is time-compresssed and recorded with said rotating heads at predetermined portions of said oblique tracks adjacent to the ends thereof, and a second recording mode in which the audio signal is recorded by means of a stationary head in a track parallel to the center line of said magnetic tape;

the tracks in which the audio signal is recorded in said first recording mode and the track in which the audio signal is recorded in said second recording mode being wholly or partially coincident with each other;

means for selectively causing said television signal recording system to operate in said first recording mode or said second recording mode; and means operatively associated with said switching means for recording a pilot signal on said magnetic tape corresponding to the recording mode in which said system is then operating.

15. A magnetic television signal recording and reproducing system characterized by having a first recording mode in which a video signal is recorded by rotating magnetic heads in a series of oblique tracks on magnetic tape, said oblique tracks being inclined at an angle with respect to the center line of said magnetic tape and being discontinuous, and wherein an audio signal is time-compressed and recorded with said rotating heads at predetermined portions of said oblique tracks adjacent to the ends thereof, the recorded video signal is reproduced, and the recorded audio signal is reproduced;

a second recording mode in which the audio signal is recorded by means of a stationary head in a track in parallel with the center line of said magnetic tape;

the tracks in which the audio signal is recorded in said first recording mode and the track in which the audio signal is recorded in said second recording mode being wholly or partially coincident with each other;

switching means for selectively causing said television signal recording and reproducing system to operate in said first recording mode or said second recording mode;

pilot signal generating means operatively associated with said switching means, for recording a pilot signal on said tape corresponding to the recording mode in which said system is then operating; and pilot signal reproducing means for reproducing said pilot signal from said magnetic tape and selectively causing said television signal recording and reproducing system to operate in a reproducing mode corresponding to the particular one of said first and second recording modes identified by said pilot signal.

16. A magnetic television signal reproducing system for reproducing a television signal from a magnetic tape which may contain a time-compressed audio signal at predetermined portions of oblique tracks or an audio signal on a track parallel to the center line of said tape, said system having:

a first producing mode in which a video signal is reproduced by rotating magnetic heads from a series of oblique tracks on a magnetic tape, said oblique tracks being inclined at an angle with respect to the center line of said magnetic tape and being discontinuous, a time-compressed audio signal being reproduced with said rotating heads from predetermined portions of said oblique tracks adjacent to the ends thereof;

a second reproducing mode in which an audio signal is reproduced by means of a stationary head from a track in parallel with the center line of said magnetic tape;

the tracks from which the audio signal is reproduced in said first reproducing mode and the track from which the audio signal is reproduced in said second mode being wholly or partially coincident with each other;

switching means for selectively causing said television signal reproducing system to operate in said first reproducing mode or said second reproducing mode;

said magnetic tape having a pilot signal thereon indicating whether the adjacent audio information is in the form of a time-compressed audio signal recorded on oblique tracks, or in the form of an audio signal recorded on a track parallel to the center line of said magnetic tape; and control means responsive to said pilot signal for causing said television signal reproducing system to operate in that one of said reproducing modes which corresponds to the type of audio information indicated by said pilot signal.

* * * * *